(12) United States Patent
Feng

(10) Patent No.: US 6,851,694 B2
(45) Date of Patent: Feb. 8, 2005

(54) TRICYCLE

(75) Inventor: Pin-Chieh Feng, Chang Hua Hsien (TW)

(73) Assignee: Melton International L.L.C., Dover, DE (US)

( * ) Notice: Subject to any disclaimer, the term of this patent is extended or adjusted under 35 U.S.C. 154(b) by 425 days.

(21) Appl. No.: 09/733,090

(22) Filed: Dec. 11, 2000

(65) Prior Publication Data

US 2002/0050695 A1 May 2, 2002

(30) Foreign Application Priority Data

Oct. 31, 2000 (TW) ........................................ 89123033 A

(51) Int. Cl.⁷ ................................................. B62K 5/06
(52) U.S. Cl. ........................... 280/220; 280/275; 280/62
(58) Field of Search ............................. 280/62, 87.01, 280/87.021, 87.03, 87.041, 87.042, 87.05, 14.28, 275, 278, 220; 267/141, 292

(56) References Cited

U.S. PATENT DOCUMENTS

| | | | | |
|---|---|---|---|---|
| 3,331,612 A | * | 7/1967 | Tietje | 280/87.042 |
| 4,050,713 A | * | 9/1977 | Williams | 280/278 |
| 4,087,106 A | * | 5/1978 | Winchell | 280/87.042 |
| 4,165,093 A | * | 8/1979 | Biskup | 280/275 |
| 4,245,848 A | * | 1/1981 | Dudouyt | 280/87.042 |
| 4,251,087 A | * | 2/1981 | Hansen | 280/87.042 |
| 4,535,976 A | * | 8/1985 | Dan et al. | 267/141 |
| 4,645,223 A | * | 2/1987 | Grossman | 280/87.042 |
| 4,660,797 A | * | 4/1987 | Tonnies | 267/141 |
| 5,593,168 A | * | 1/1997 | Chou | 280/275 |
| 5,611,555 A | * | 3/1997 | Vidal | 280/62 |
| 6,209,858 B1 | * | 4/2001 | Fujii | 267/292 |
| 6,220,612 B1 | * | 4/2001 | Beleski, Jr. | 280/87.041 |

* cited by examiner

Primary Examiner—Brian L. Johnson
Assistant Examiner—J. Allen Shriver
(74) Attorney, Agent, or Firm—Browdy and Neimark, P.L.L.C.

(57) ABSTRACT

A tricycle comprises a front tube, a handlebar frame, a front fork, a front wheel, two footboard frames, and a swiveling member. The handlebar frame is received in the front tube. The front fork is disposed at the bottom end of the handlebar frame for fastening the front wheel. The two footboard frames are pivoted with the front tube and are formed of a bottom tube, a footboard, and a rear wheel. The bottom tube is provided with a through hole to accommodate a buffer member such that the buffer member is pivoted with the rear end of the front tube. The swiveling member is provided in two sides with two insertion pillars which are connected with the buffer member.

8 Claims, 7 Drawing Sheets

TRICYCLE

FIELD OF THE INVENTION

The present invention relates generally to a human powered vehicle, and more particularly to a tricycle.

BACKGROUND OF THE INVENTION

The tricycle is basically similar in construction to a scooter, which is derived from the bicycle. The tricycle is formed of a frame which is somewhat different from those of both bicycle and scooter. The tricycle is intended for recreational purpose.

SUMMARY OF THE INVENTION

The primary objective of the present invention is to provide a tricycle for recreational purpose. The tricycle is relatively safe.

The tricycle of the present invention comprises a front tube, a handlebar frame, a front fork, a front wheel, two footboard frames, and a swiveling member. The handlebar frame comprises an upright portion which is received in the front tube, and a grip portion extending from the top of the upright portion. The front fork comprises two side wings extending from the bottom of the upright portion such that the free end of the side wings is provided with a shaft connection portion to which the front wheel is fastened. The footboard frames are fastened with the front tube and formed of a bottom tube which is pivoted with the front tube. A footboard is fastened with the rear end of the bottom tube. A rear wheel is fastened with the underside of the footboard. The bottom tubes are provided with a buffer member which is provided with a center through hole. The swiveling member is pivoted to the rear end of the front tube and is provided with two insertion pillars, which are received in the through holes of the buffer members.

DETAILED DESCRIPTION OF THE INVENTION

Figure 1:
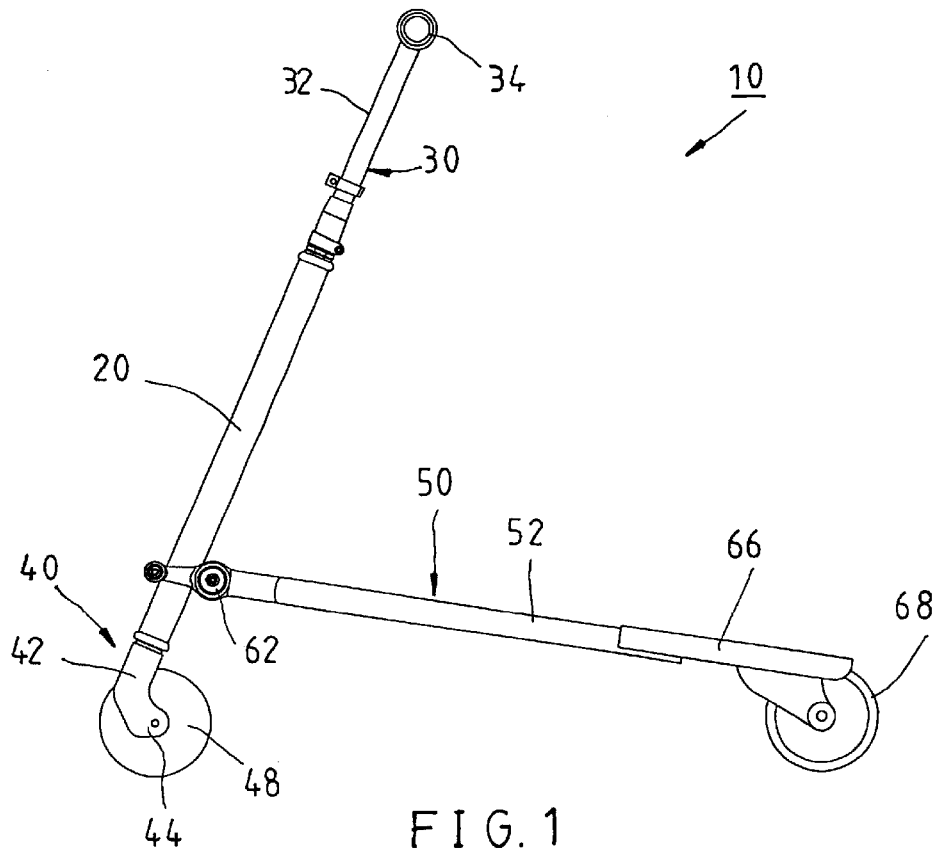
FIG. 1 shows a side view of a first preferred embodiment of the present invention.
Figure 2:
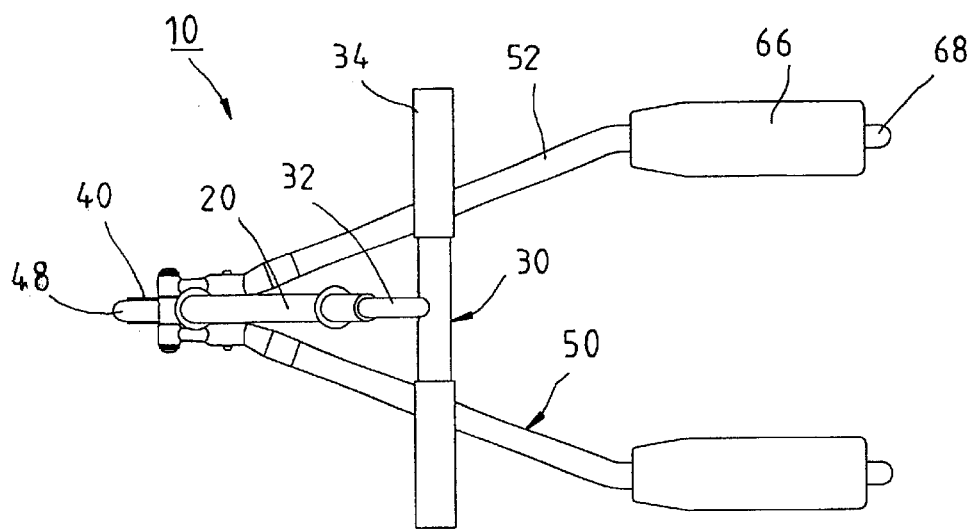
FIG. 2 shows a top view of the first preferred embodiment of the present invention.

As shown in FIGS. 1–4, a tricycle 10 of the first preferred embodiment of the present invention comprises a front tube 20, a handlebar frame 30, a front fork 40, a front wheel 48, two footboard frames 50, and a swiveling member 70.

The front tube 20 is made of a metal or aluminum alloy and is provided at the front side of the lower end with a pivoting seat 21 which is provided at the center with a horizontal pivoting hole 22. The tube 20 is provided at the rear side of the lower end with a protruded pillar 24 which is provided at the rear end thereof with a threaded hole 25.

The handlebar frame 30 comprises an upright portion 32 with its top end and bottom end being jutted out of the front tube 20, and a grip portion 34 extending from the top end of the upright portion 32.

The front fork 40 comprises two side wings 42, with each extending from the bottom end of the upright portion 32 and having a shaft connection portion 44 extending from the bottom end thereof for mounting the front wheel 48.

Figure 3:
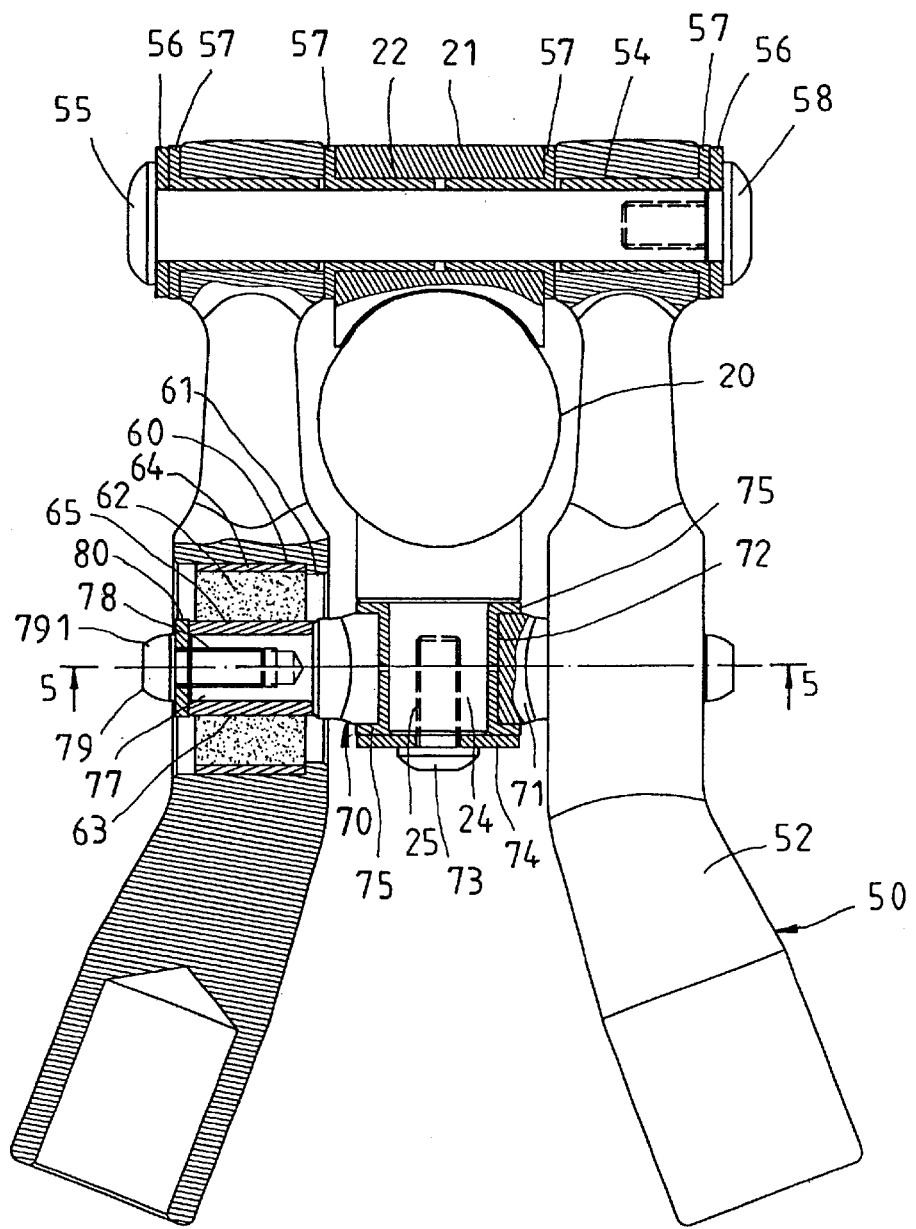
FIG. 3 shows a partial sectional view of the footboard frame and the swiveling member of the first preferred embodiment of the present invention.
Figure 4:
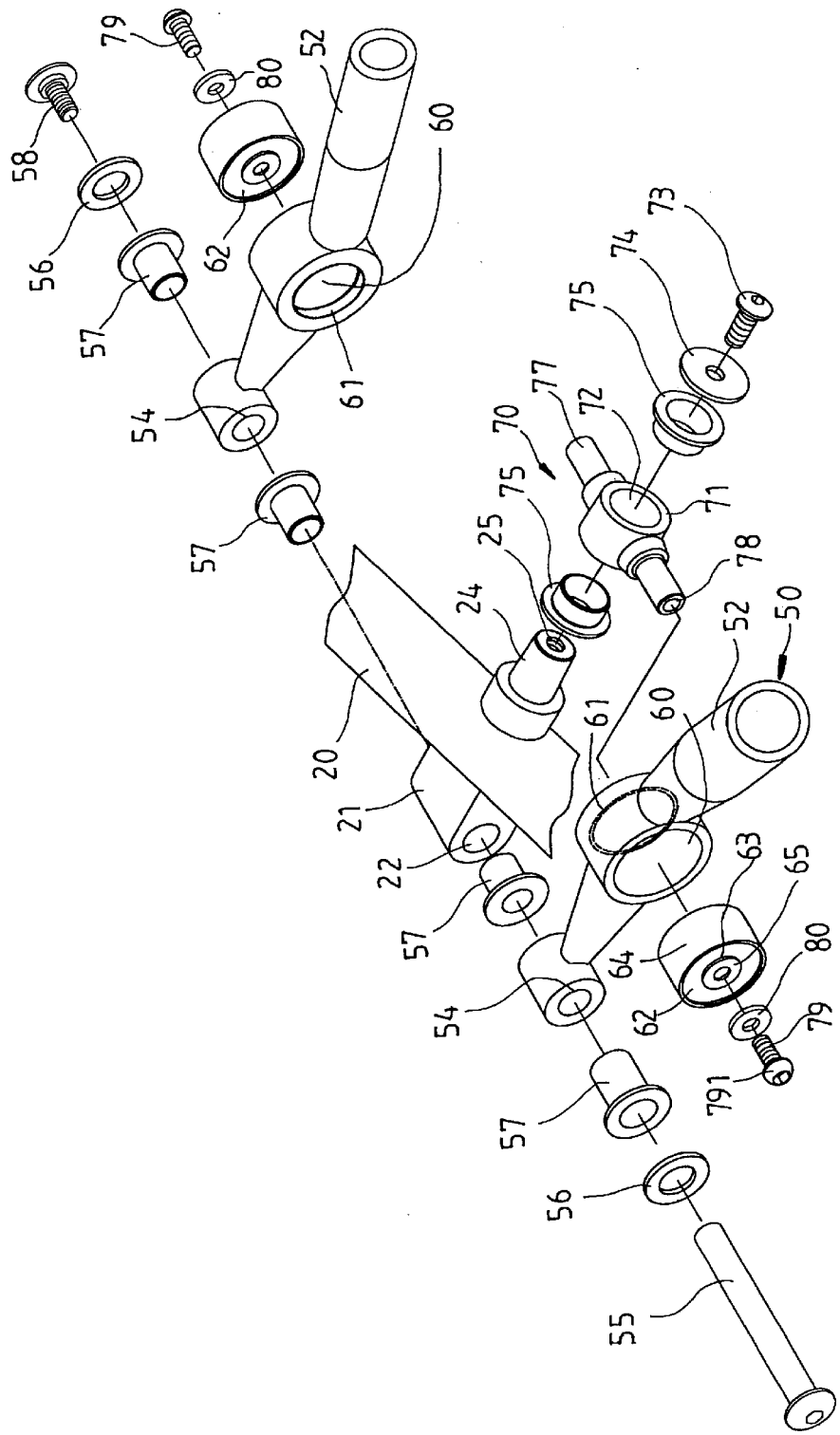
FIG. 4 shows an exploded view of the front tube, the footboard frame, and the swiveling member of the first preferred embodiment of the present invention.

The two footboard frames 50 are mounted on two sides of the front tube 20 and are formed of a bottom tube 52 which is pivoted at the front end with the front tube 20, a footboard 66 which is mounted on the rear end of the bottom tube 52, and a rear wheel 68 fastened with the underside of the footboard 66. As shown in FIGS. 3 and 4, the two bottom tubes 52 are provided at the front end with a horizontally-extending pivoting hole 54 corresponding in location to the pivoting hole 22 of the front tube 20. The bottom tube 52 and the front tube 20 are pivoted together by a pivot 55 which is put through the pivoting holes 54 and 22. The front tube 20, the two bottom tubes 52, and the pivot 55 are provided with a plurality of pads 56, plastic sleeves 57, and bolts 58.

The bottom tubes 52 are provided with a through hole 60 for disposing a buffer member 62 of an elastic material, such as rubber. The buffer member 62 of a short cylindrical body is provided at the center with a through hole 63, and in the outer surface with an outer protective tube 64 for making contact with the inner edge of the through hole 60 of the bottom tube 52. The through hole 63 of the buffer member 60 is provided with an inner protective tube 65. The protective tubes 64 and 65 are made of metal. The through hole 60 are provided in two opposite sides with a protruded edge 61, which is urged by the outer protective tube 64 of the buffer member 62.

The swiveling member 70 has a body 71 which is provided with a through hole 72 for receiving the protruded pillar 24. The swiveling member 70 is pivoted with the front tube 24 by a bolt 73 which is engaged with the threaded hole 25 of the protruded pillar 24. The swiveling member 70, the protruded pillar 24, and the bolt 73 are provided with a plurality of pads 74 and plastic sleeves 75. The body 71 is provided in two sides with two insertion pillars 77, which are received in the inner protective tubes 65 of the buffer members 62. The free ends of the insertion pillars 77 are provided with a threaded hole 78 and a bolt 79 which is engaged with the threaded hole 78 for fastening the buffer member 62, the bottom tube 52 and the swiveling member 70. The bolt 79 has a head 791, which urges the inner protective tube 65 of the buffer member 62 by means of a pad 80.

The present invention is provided with a brake to control the front wheel 48 or rear wheel 68.

Figure 8:
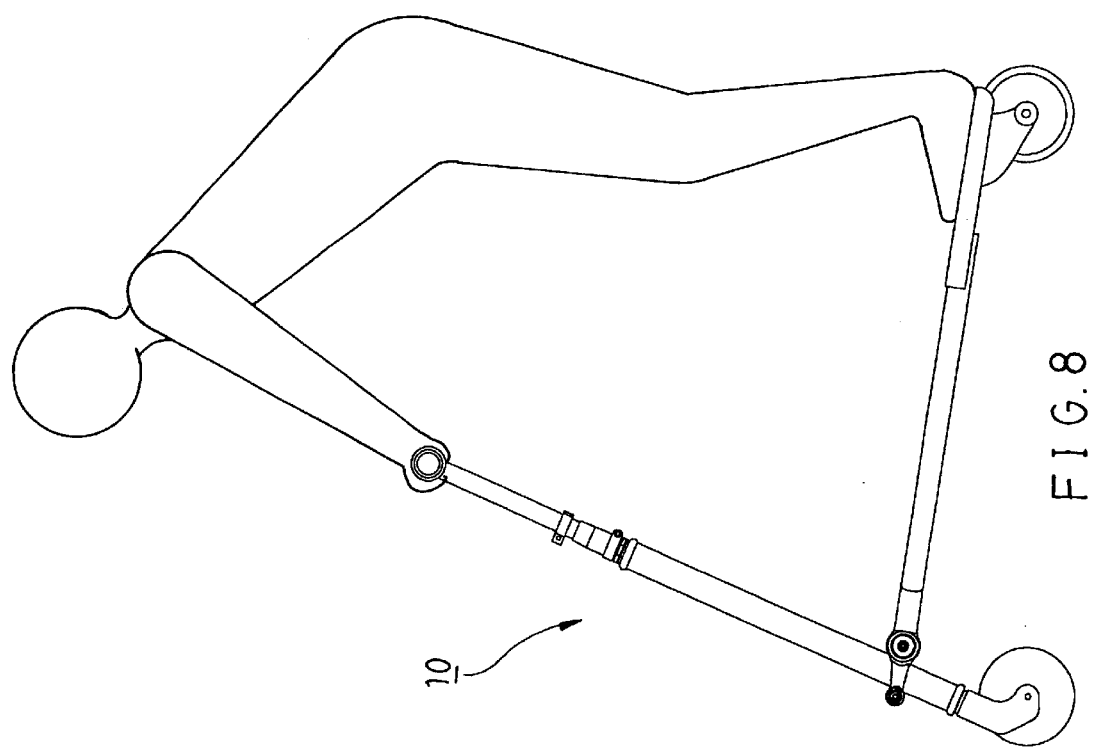
FIG. 8 shows a schematic view of the first preferred embodiment of the present invention in operation.
Figure 9:
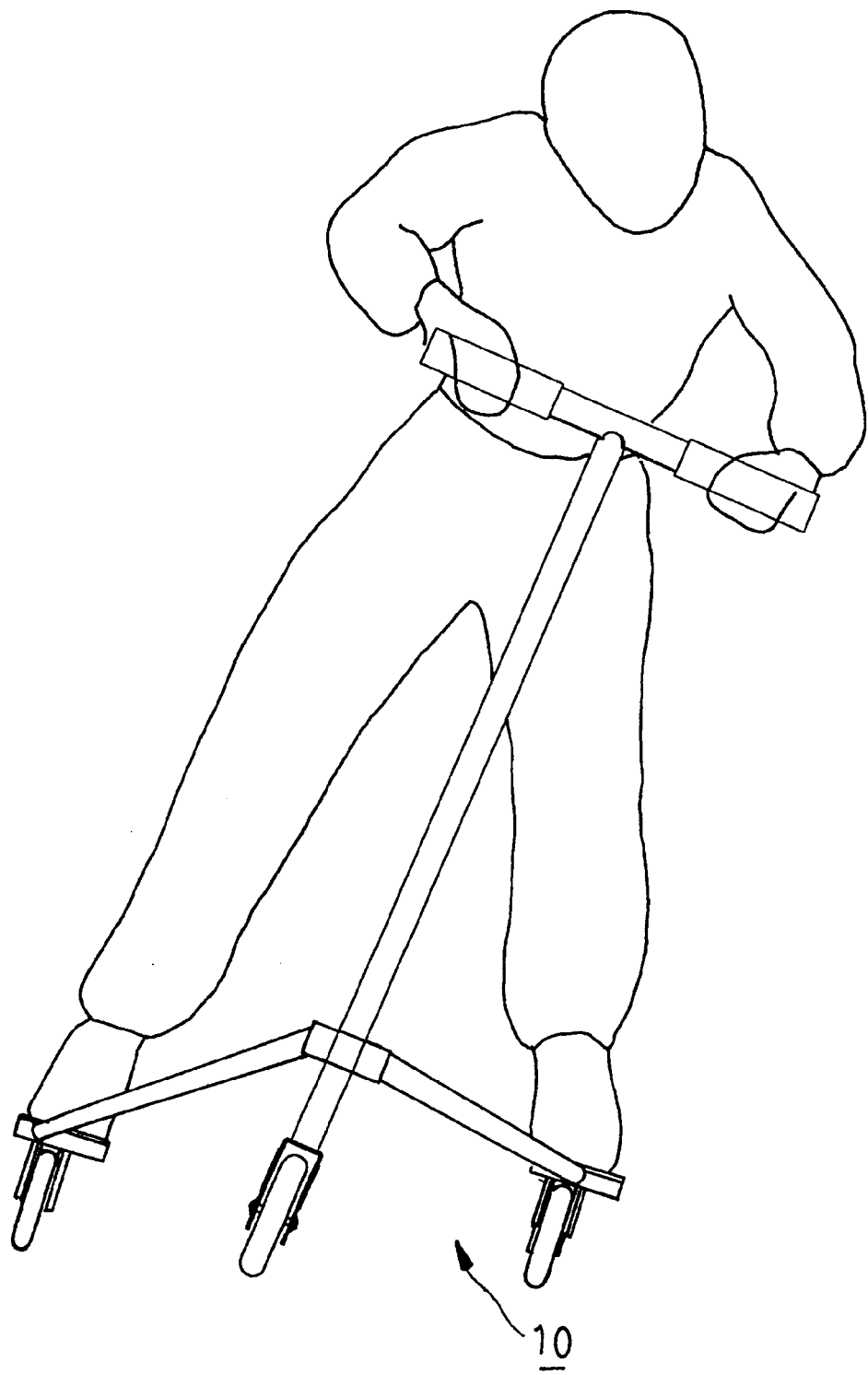
FIG. 9 shows another schematic view of the first preferred embodiment of the present invention in operation.

As shown in FIGS. 8 and 9, both hands of a rider hold the grips 34 of the handlebar frame 30 such that both feet are on the footboards 66 of the two footboard frame 50. The tricycle is moved forward by rotating the handlebar frame 30 repeatedly and by changing the center of gravity of the rider to cause the tricycle to tilt leftward and rightward.

Figure 5:
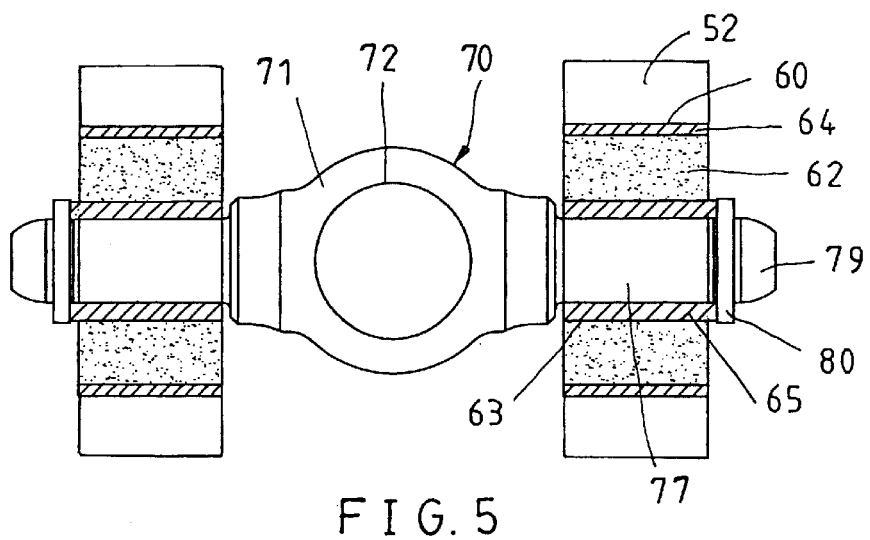
FIG. 5 shows a sectional view taken along the direction indicated by a line 5—5 as shown in FIG. 3.
Figure 6:
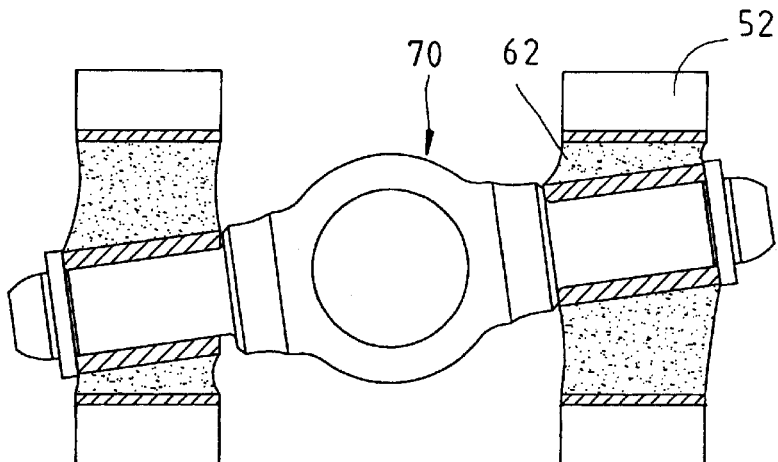
FIG. 6 shows a schematic view of the first action state of the first preferred embodiment of the present invention.
Figure 7:
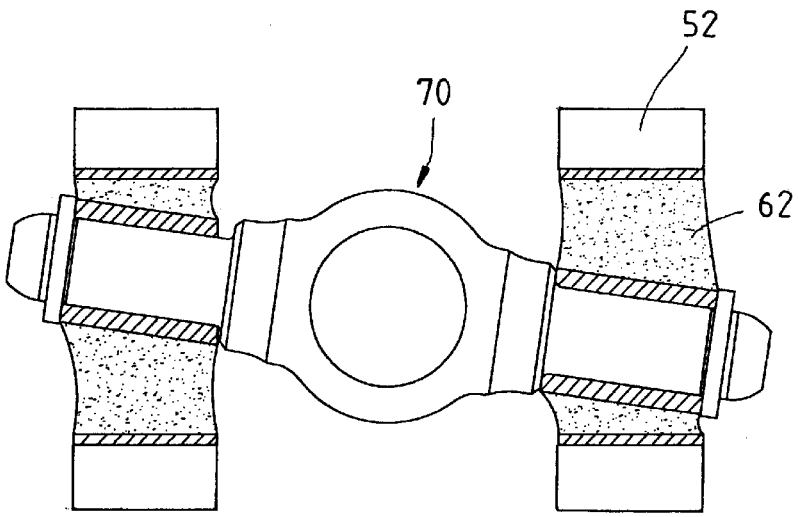
FIG. 7 shows a schematic view of the second action state of the first preferred embodiment of the present invention.

As shown in FIGS. 5–7, as the tricycle 10 is titled leftward and rightward, the two footboard frames 50 turn on the pivot 55. In the meantime, as shown in FIGS. 5–7, the swiveling member 70 turns back and forth on the protruded pillar 24 in a plane perpendicular to the cross-section of through holes 60 such that the relative position of the insertion pillar 77 in relation to the through hole 60 is changed, thereby resulting in deformation of the buffer member 62 to effect a spring force to force each member to return to its original position, as shown in FIG. 5. The present invention is thus energy-efficient.

Figure 10:
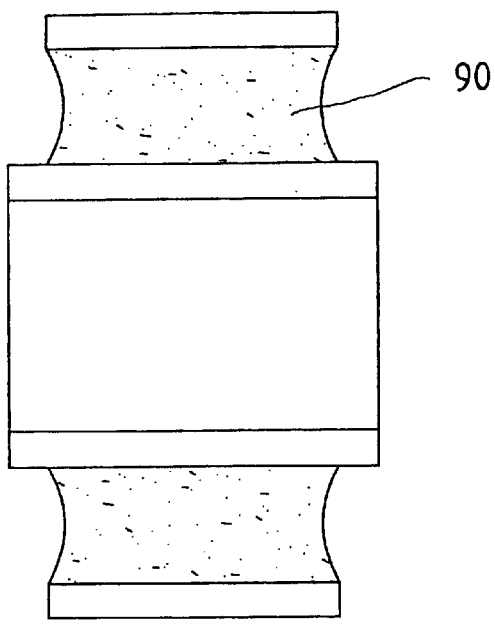
FIG. 10 shows a sectional view of the buffer member of a second preferred embodiment of the present invention.
Figure 11:
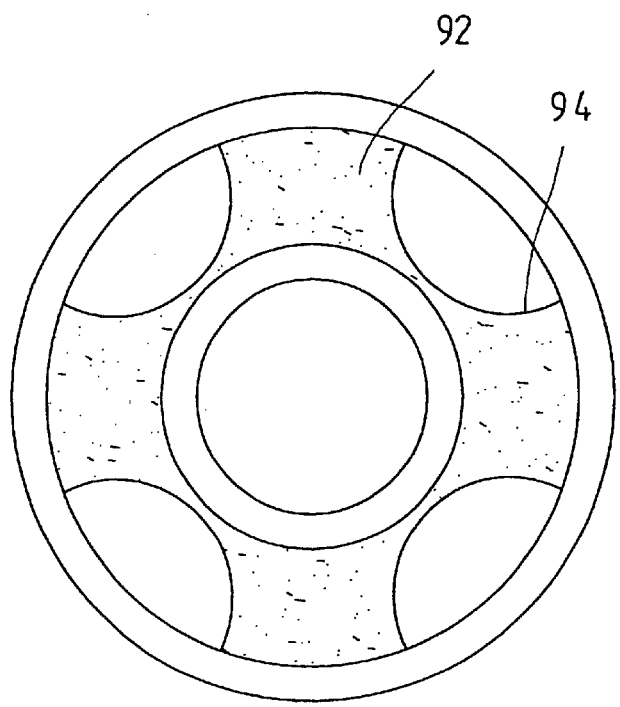
FIG. 11 shows a front view of the buffer member of a third preferred embodiment of the present invention.

The buffer member 62 reduces the mechanical friction of the members, thereby reducing the noise. The present invention can be used to perform acrobatic tricks. The buffer member 62 may be of various forms. As shown in FIG. 10, the buffer member 90 has an arcuate side. As shown in FIG. 11, the buffer member 92 is provided in the outer edge with a plurality of depressions 94. Such designs allow the buffer members 90 and 92 to have a greater deformation.

What is claimed is:

1. A tricycle comprising:

a front tube;

a handlebar frame comprising an upright portion which is received in said front tube, and a grip portion extending from two sides of a top end of said upright portion;

a front fork comprising two side wings extending from a bottom end of said upright portion, wherein free ends of said side wings are provided with a shaft connection portion;

a front wheel fastened with said shaft connection portion;

two footboard frames respectively engaged on opposite sides of said front tube, each having a bottom tube which is pivotably engaged on a front side of said front tube, a footboard fastened to a rear end of each said bottom tube, and a rear wheel engaged on an underside of each said footboard, each said bottom tube being provided with a through hole having a buffer member of an elastic material therein, said buffer member having a through hole at a center thereof; and a swiveling member pivotably engaged on a rear side of said front tube having an insertion pillar, each end of the insertion pillar respectively engaged in said through hole of said buffer member;

wherein when the tricycle is in operation, the insertion pillar is free to rotate on the front tube in a plane perpendicular to the cross-section of the through holes.

2. The tricycle as defined in claim 1, wherein said front tube is provided at the front side thereof with a pivoting seat which is provided in the center thereof with a pivoting hole; wherein each of said bottom tubes are provided at a front end with a pivoting hole whereby said bottom tubes and said front tube are pivoted together by a pivot which is received in said pivoting hole of said pivoting seat and said bottom tubes.

3. The tricycle as defined in claim 1, wherein said buffer member is provided on a circumference thereof with an outer protective tube in contact with the circumference of said through hole of said bottom tubes.

4. The tricycle as defined in claim 3, wherein said through hole of said buffer member is provided on a circumference thereof with an inner protective tube in contact with a circumference of said insertion pillar of said swiveling member.

5. The tricycle as defined in claim 1, wherein said through hole of said buffer member is provided on a circumference thereof with an inner protective tube engaged to said insertion pillar of said swiveling member.

6. The tricycle as defined in claim 1, wherein said buffer member has an arcuate side allowing said buffer member a greater deformation.

7. The tricycle as defined in claim 1, wherein said buffer member is provided in outer periphery with a plurality of depressions allowing said buffer member a greater deformation.

8. The tricycle as defined in claim 1, wherein said front tube is provided at the rear side with a protruded pillar; wherein said swiveling member is provided with a through hole for receiving said protruded pillar, wherein said protruded pillar is provided with a threaded hole which is engaged with a bolt fastening said swiveling member to said front tube.

* * * * *